United States Patent [19]

DeWitt

[11] 4,129,162
[45] Dec. 12, 1978

[54] PNEUMATIC TIRE

[75] Inventor: Marion A. DeWitt, North Canton, Ohio

[73] Assignee: The Goodyear Tire & Rubber Company, Akron, Ohio

[21] Appl. No.: 704,635

[22] Filed: Jul. 12, 1976

[51] Int. Cl.$^2$ ................................ B60C 9/06
[52] U.S. Cl. .................. 152/354 RB; 152/357 R; 152/361 R
[58] Field of Search ..... 152/361 R, 361 DM, 361 FP, 152/354, 355, 357 R, 356, 330 RF

[56] References Cited

U.S. PATENT DOCUMENTS

| | | | |
|---|---|---|---|
| 3,386,487 | 6/1968 | Massoubre | 152/361 DM |
| 3,500,888 | 3/1970 | Boileau | 152/356 |
| 3,568,749 | 3/1971 | Menell et al. | 152/361 R |
| 3,881,492 | 5/1975 | Mirtain | 152/361 DM |
| 3,938,573 | 2/1976 | Hallenbeck | 152/330 RF |

FOREIGN PATENT DOCUMENTS 1480929  3/1969  Fed. Rep. of Germany ...... 152/361 R

Primary Examiner—Drayton E. Hoffman
Assistant Examiner—Carl Rowold
Attorney, Agent, or Firm—Hugh A. Chapin; R. P. Yaist

[57] ABSTRACT

A simplified radial ply tire containing a high modulus single carcass ply and a high modulus single belt ply with the cords in the carcass ply extending radially in the sidewall and at a bias angle in the tread area. The cords in the belt ply extend at an opposite bias angle to those of the carcass ply. A pair of continuous low modulus cord reinforced shoulder strips are provided and extend circumferentially about the tire adjacent the outer edges of the belt structure. Belt coatings, ply angles, shoulder strip orientation, bead region construction and other features are also disclosed.

5 Claims, 4 Drawing Figures

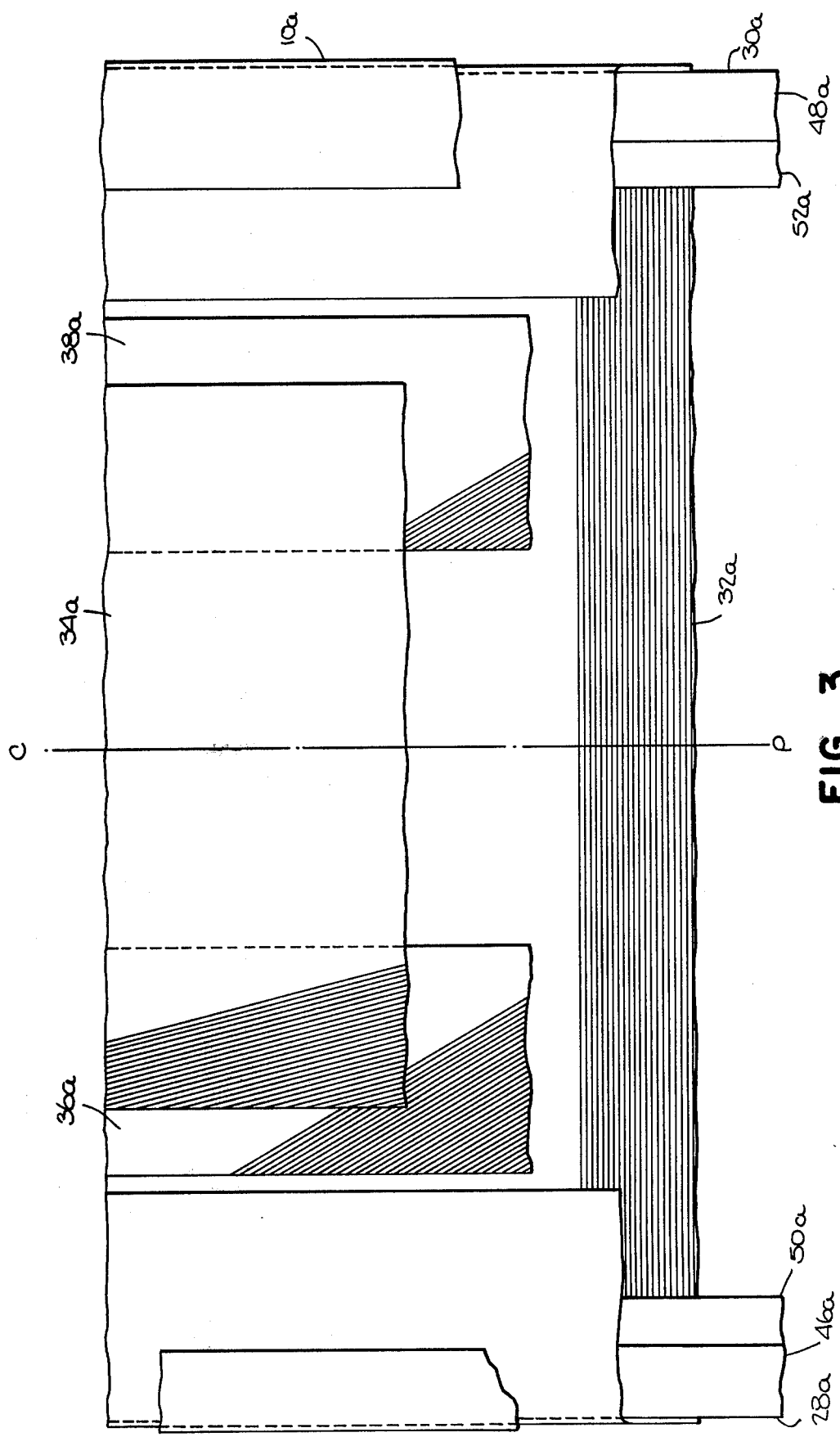

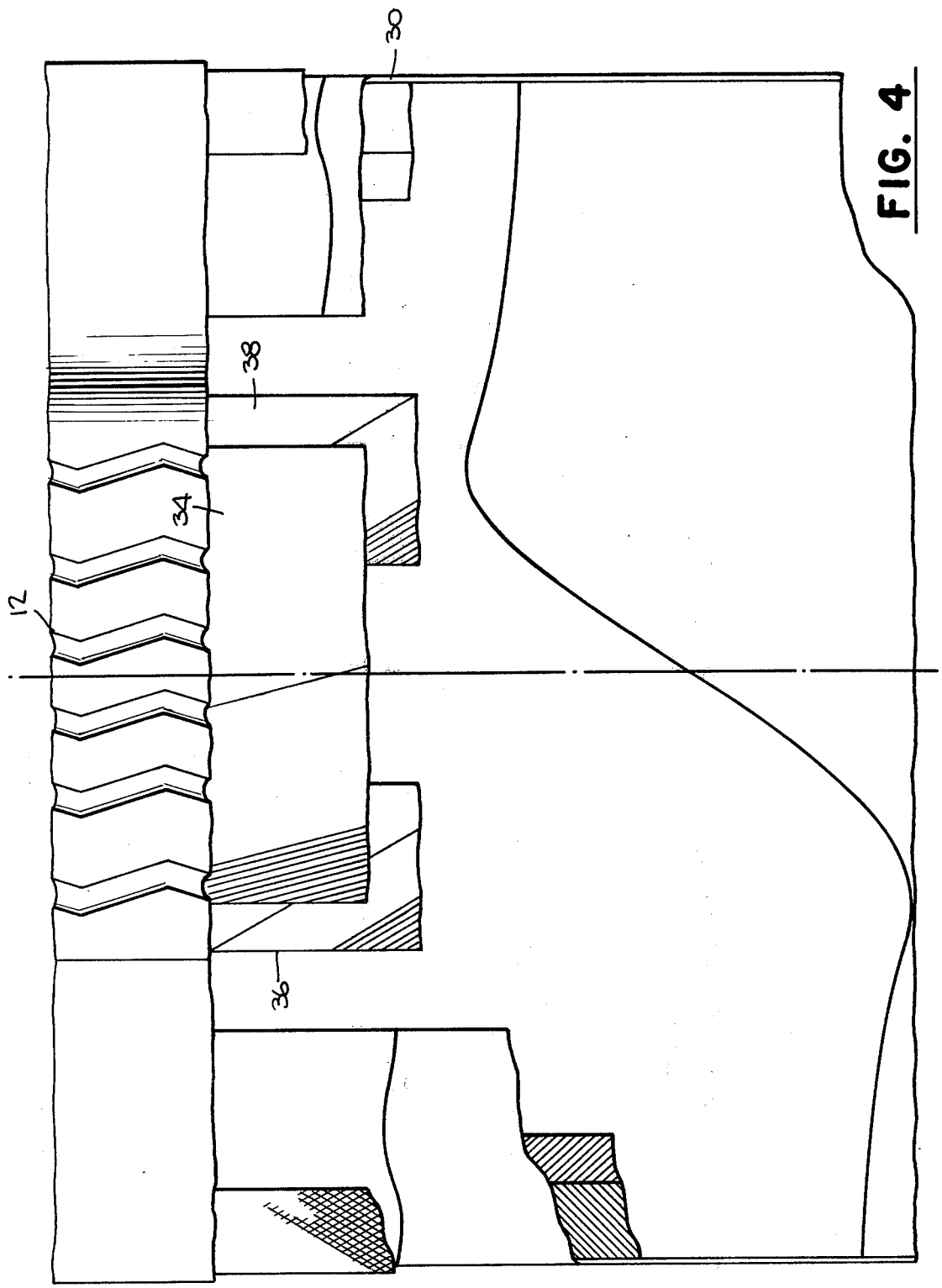

PNEUMATIC TIRE

BACKGROUND OF THE INVENTION

This invention relates generally to pneumatic tires and more particularly to a simplified structure for a radial ply pneumatic tire.

It has been suggested in the past to provide simplified radial ply tires of a type wherein all of the cords in the belt structure extend at one bias angle with respect to the midcircumferential centerline and all of the cords in the carcass structure extend in a generally radial direction in the sidewalls but at a bias angle opposite to that of the cords in the tread portion of the belt structure. Such tires are made by providing a generally cylindrical uncured tire carcass in which the cords in the carcass plies extend in generally axial directions and the cords in the belt plies extend in a generally diagonal direction with respect to the centerplane. The tire may then be shaped to the torus form whereby the cord angles in the carcass structure and belt structure are reduced in the area of the tread and the tire is cured in a mold. Examples of such tires are found in German Pat. No. 1,153,279 and U.S. Pat. No. 3,327,753.

It is this type of a simplified radial tire with which the present invention is generally concerned.

SUMMARY OF THE INVENTION

Briefly stated, the present invention is directed at a simplified radial ply pneumatic tire which includes a tread portion and a pair of sidewall portions extending radially inward from the tread portion and terminating in a bead portion at the end thereof. A single carcass ply extends circumferentially about the tire with the cords therein extending from bead to bead and being oriented in a generally radial direction in the sidewall portion. A single belt ply extends circumferentially about the tire and terminates in the axial direction adjacent the outer edges of the tread portion. The cords of the belt ply extend from one side of the belt to the other and form an angle with respect to the mid-circumferential centerplane. A pair of shoulder strips are provided and extend circumferentially about the tire at each edge of the belt ply and are in a partially overlaping relation with the belt ply.

The shoulder strips are disposed radially inwardly with respect to the belt ply and radially outwardly with respect to the carcass ply in one embodiment. Further, the shoulder strips may be disposed with one edge sandwiched between the belt and carcass ply or in overlapping relation therewith. Preferably, at least one third of the axial width of each shoulder strip is disposed axially outwardly of the axial outer edge of the belt ply. The cords in the shoulder strips extend generally disposed in the same direction as the cords in the belt ply. Preferably, the angle formed by the cords of the shoulder strips with respect to the mid-circumferential centerplane is at least 5° greater than the angle formed by the cords of the belt ply with respect to the mid-circumferential centerplane.

Additional features relating to belt coatings, ply angles, shoulder strip orientation, bead region construction, and the like are also disclosed for use in a simplified radial type of tire. Accordingly, it is an object of this invention to provide an improved pneumatic tire of a simplified radial type design.

It is another object of this invention to provide a pneumatic tire of a simplified radial ply type wherein reinforcing shoulder strips are provided.

It is still another object of this invention to provide a pneumatic tire having a single belt ply, a single carcass ply and a pair of reinforcing shoulder strips.

Other objects, advantages and features of the present invention will become apparent from the following description.

To the accomplishment of the foregoing and related end, the invention, then, comprises the features herein described and particularly pointed out in the claims, the following description and the annexed drawings setting forth in detail certain illustrative embodiments of the invention, these being indicative, however, of but some of the various ways in which the principles of the invention may be employed.

BRIEF DESCRIPTION OF THE DRAWINGS

FIG. 3 is a sectional plan view of the tire of FIG. 1 schematically depicting the assembly of the plies of the tire prior to shaping to the tire form; and FIG. 4 is a sectional plan view of the tire of FIG. 1 schematically depicting the assembly of the plies subsequent to shaping to the tire form.

DECRIPTION OF THE PREFERRED EMBODIMENT

Figure 1:
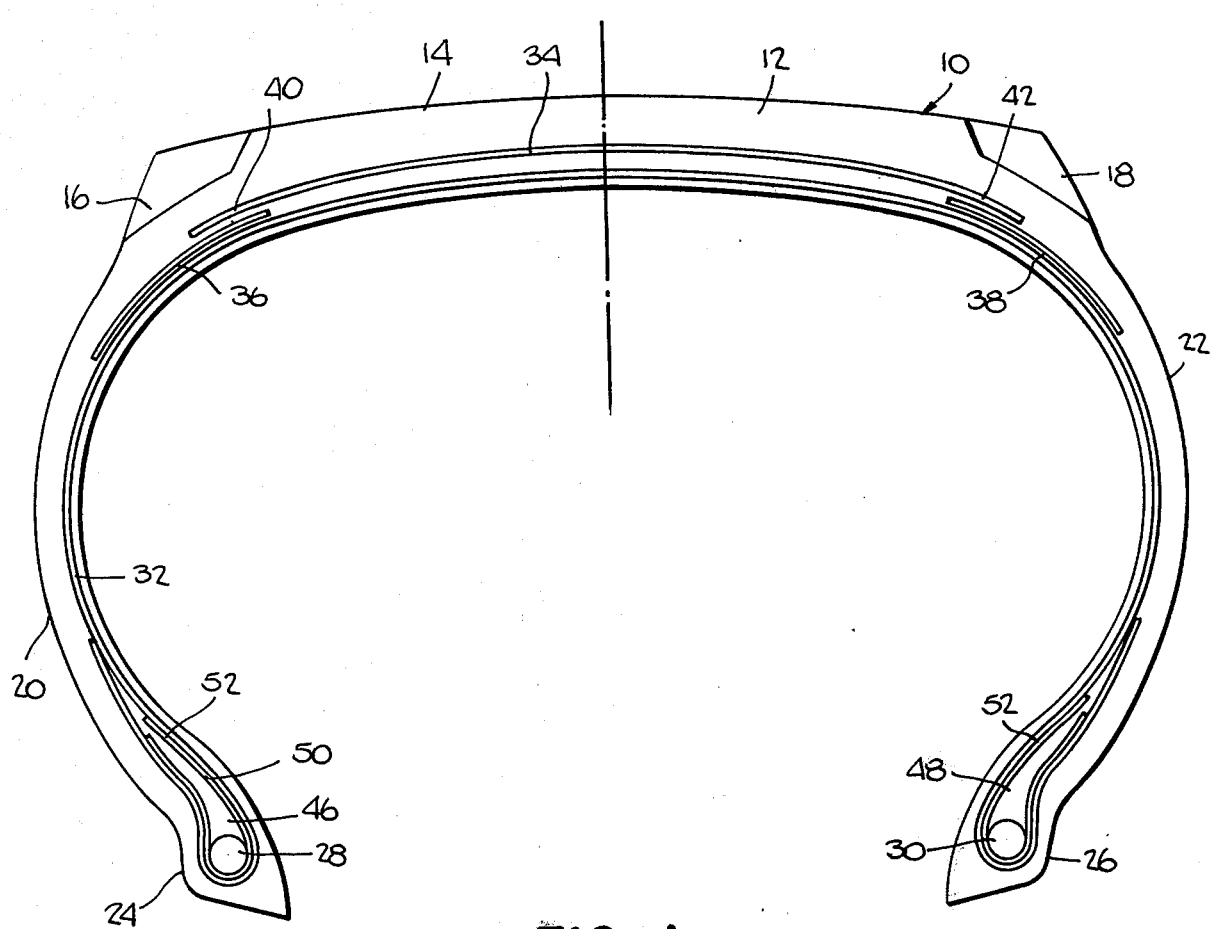
FIG. 1 is a cross-sectional view of a tire constructed in accordance with the present invention.

With reference to the drawings and in particular to FIG. 1, there is illustrated a tire 10 comprising a circumferentially extending tread portion 12 having a ground-contacting surface 14 which extends circumferentially about the tire and axially from one shoulder portion 16 to the opposite shoulder portion 18. A pair of sidewall portions 20 and 22 extend radially inwardly from the respective shoulder portions 16 and 18 and terminate at their radially inner extremities in annular bead portions 24 and 26. The bead portions 24 and 26 are formed of annular inextensible bead cores 28 and 30 respectively.

A carcass ply 32 includes a continuous cord fabric extending circumferentially about the tire. The carcass ply or carcass structure 32 is formed by cords extending continuously from one bead core 28, through sidewall 20, across the tread portion 12, through the sidewall 22 and to the inextensible bead core 30.

A belt ply 34 extends circumferentially about the tire and axially from one shoulder portion 16 to the other shoulder portion 18. The cords in the belt ply 34 extend continuously across the axial extent of the belt ply 34. The belt ply or belt structure 34 is formed by cords which extend continuously across the tread portion substantially from one shoulder 16 to the other shoulder 18. For the purposes of this invention, the angle of the cord shall be understood to refer to the angle that that cord makes with a circle lying in a plane perpendicular to the rotational axis of the tire and having the axis of the tire as its center.

A ply of continuous cord fabric or shoulder strip is disposed in each shoulder area 16 and 18 adjacent the respective axially outer ends 40, 42 of the belt structure 34. Shoulder strips 36 and 38 in the embodiment of FIG. 1 overlap the carcass ply 32 and have their axial inward edge disposed between the carcass ply 32 and belt ply 34. In the particular embodiment illustrated in FIG. 1, a rubber apex strip 46 and 48 extends radially outwardly from the respective inextensible bead core 28 and 30. Additionally, sections of square woven fabric or flippers 50 and 52 are provided and which extend about the respective bead cores 28 and 30 to encase both sides of the respective apex strip 46 and 48. In the preferred embodiment, the cords of the belt structure are wire, the cords of the shoulder strips are nylon and the cords in the carcass structure are fiberglass.

Figure 2:
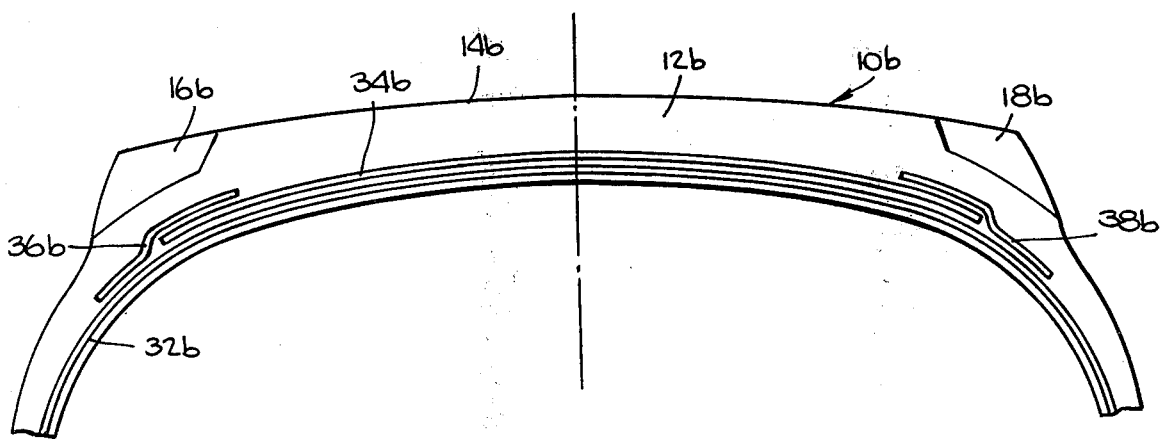
FIG. 2 is a cross-sectional view similar to that of FIG. 1 but only showing the tread and shoulder area of the tire and illustrating an alternate embodiment of the present invention.

FIG. 2 illustrates an alternate embodiment of the simplified radial ply tire of this invention. Here again carcass ply 32b (the items in this figure use the same numerical designations but with the postscript b) is positioned radially inward with the belt ply 32b being disposed in overlapping relation in the tread region 14b. The shoulder strips 32b and 38b are positioned overlapping both the carcass ply 32b and belt ply 34b. Thus, a portion of the belt ply 34b is sandwiched between the shoulder strips 36b and 38b and the carcass ply 32b.

With reference to FIG. 3, the tire 10 of FIG. 1 is constructed by first building the unvulcanized tire structure on a generally cylindrical drum. For purposes of continuity, unvulcanized components of the tire as they appear in the assembled uncured tire on the cylindrical drum will be referred to with the same numerical designation as referred to in conjunction with early figures but with the postscript a.

In building the tire 10a, a carcass ply 32a of axially extending cords is wrapped circumferentially about the tire building drum. Bead core assemblies including bead cores 28a and 30a, apex strips 46a and 48a and rubberized fabric flipper strips 50a and 52a are disposed respectively about the axially outer end portions of the carcass ply 32a. The axially outer ends of the carcass ply 32a are then turned over the bead core assemblies in the conventional manner. A pair of shoulder reinforcing strips 36a and 38a are wrapped circumferentially about the carcass ply 32a in a predetermined position spaced axially outwardly of centerplane CP. For purposes of this disclosure, the centerplane is understood to be a plane perpendicular to the rotational axis of the tire and midway between the bead cores 28 and 30. The spacing in the unvulcanized state is greater than the axial spacing which the shoulder strips 36a and 38a assume in the finished tire. This is done to accommodate the axial contraction of the tire structure when it is shaped to the torus form.

A belt ply of continuous tire cord fabric 34a is wrapped circumferentially about the carcass ply 32a and extends in axial directions across only a portion of each shoulder ply 36a and 38a. The cords of the belt ply 34a extend in the same general direction with respect to the centerplane CP as those in the shoulder strips 36a and 38a but at an angle which is at least 5° less than that of the shoulder strips 36a and 38a with respect to the centerplane. Further, it is preferred that when building the tire the cords of belt ply 34 form an angle between 25° and 40° with respect to the mid-circumferential centerplane. Tread rubber 12 and sidewall rubber 20 and 22 are than wrapped circumferentially about the tire assembly.

The tire is shaped to the torus form during which the cord angles of all the plies in the tread area are reduced significantly to that illustrated in FIG. 4. It will appreciated that the cords in the carcass ply 32 in the tread portion of the tire extend in generally opposite angular directions with respect to the centerplane than those of the belt ply 34 and shoulder plies 36 and 38. In the finished tire, the cords of the belt ply 34 preferably form an angle between 10° and 30° with respect to the mid-circumferential centerplane. It will also be noted that the cords in the belt ply extend at substantially the same angle throughout the entire width of the belt ply 34 with little or no flaring at the axially outer edges. The cord angle of the cords in the belt ply at the axially outer edges of the belt should be within 5° of the cord angle of the belt at the centerplane and preferably within 2°.

It will also be noted that the large change in cord angle in the carcass plies from that at the centerplane CP to the substantially radial orientation in the sidewalls is accomplished generally in the area beneath the shoulder strips 36 and 38. It is believed that the shoulder strips 36 and 38, being of lower modulus than either the carcass ply or belt ply, tend to form a buffer for the pantographing action between these two plies in order to permit the complete pantographing of the belt ply 34 all the way to the axially outer edges while still permitting the flaring or gradual changing of the angle in the carcass ply 32 beneath the shoulder strips. Thus, the belt structure remains substantially firm and stable all the way to the axially outer edges.

By way of a specific example, in a tire shaped to the torus form the cord angles of the carcass ply, belt ply and shoulder strips were significantly reduced.

In the torus form, the cord angle of the belt ply 34 was reduced to 14° at the mid-circumferential centerline and flared out to only 17° at the axially outer edges. The cord angle of the shoulder strips 36 and 38 was reduced to 30 degrees at the axially outer edges of the belt structure 34. The cord angle of the carcass ply was reduced to 30° at the mid-circumferential centerplane.

As previously mentioned, the substantial portion of the change in cord angle from bias to radial occurs beneath the shoulder strips 36 and 38. It will also be noted that the angle of the carcass ply cords changes from 30° at the mid-circumferential centerline completely through an angle of 90° and decreased again to an angle somewhat less than 90° but slanting in an opposite direction with respect to the mid-circumferential centerline. Preferably, the cords in the carcass ply form an angle of between 18° and 45° with respect to the mid-circumferential centerplane in the belt portion of the tire.

Further, it has been found that in a tire of the general construction described herein, improved results are obtained by specific belt coatings, ply angles, shoulder strip orientation, bead region construction and others. One such improvement resulted from applying to the belt ply 34, a coating with a relatively high dynamic modulus. Specifically, tires made in accordance with this invention were treated with coatings applied to the belt ply 34 having a different dynamic modulus. One tire was treated with a rubber compound having a dynamic modulus of 191 and the other was treated with a rubber compound having a dynamic modulus of 181. The tire fabricated with the coating having a 5.5% higher dynamics modulus produced an improved cornering coefficient of 3.7%. Also, it was found that when the belt was odd coated to an 0.016/0.036 gauge with the rubber compound and applied with the heavy side down, a 3.6% improvement in the cornering coefficient resulted. In this connection, laying the shoulder strips 36 and 38 with the cords at an angle opposite with respect to those of the belt ply 34 as described previously, produced at 1.5% gain in the cornering coefficient.

The cornering coefficient was also improved by modifying the bead region construction. For instance, by lowering the portion of the carcass ply 32 which is turned up over the beads 28 and 30 from 2.5 inch to 1.5 inches above the bead centerline, a 5.5% increase in cornering coefficient was obtained. Also, a 2.5% improvement in cornering coefficient was obtained when the height of flipper 52 was increased 0.3 inches to a height of 1.5 inches, above the centerline of beads 28 and 30.

It has also been found that the cord angle of the carcass ply 32 effected the cornering coefficient. By lowering the cord angle of carcass ply 32 to 85°, an increase in the cornering coefficient of 5.5% was produced. Furthermore, the lower ply angle also produces a more radial sidewall, which it is believed improves the directional pull which heretofore appeared inherent in tires of the simplified radial design.

Thus, there has been disclosed a pneumatic tire of a simplified radial design having reinforcing shoulder strips. Also, other advantageous features producing improved results have been described.

Although the above description is directed to a preferred embodiment of the invention, it is noted that other variations and modifications will be apparent to those skilled in the art, and may be made without departing from the spirit and scope of the present disclosure.

What is claimed is:

1. A pneumatic tire comprising a ground contacting tread portion, a pair of sidewall portions extending radially inwardly from the axial outer edges of said tread portion and terminating at each radial inner extremity in a bead portion, a single carcass ply of tire cord fabric extending circumferentially about the tire with the cords in said carcass ply extending continuously from bead to bead in a generally radial direction in the sidewall portions and at an angle no greater than 45° with respect to the mid-circumferential centerplane of the tire, said carcass ply being further characterized in that each end thereof is wrapped around the respective bead portions with a turn-up of said carcass ply extending approximately 1.5 inches above the centerline of said bead portion, a flipper section wrapped around each of said bead portions and which extends to a height approximately 1.5 inches above the centerline of said bead portion, a single belt ply of tire cord fabric extending circumferentially about the tire and terminating in the axial direction adjacent the axial outer edges of the tread portion, said belt ply having continuous cords extending from one side of the belt to the other side, and a pair of shoulder strips extending circumferentially about the tire at each axial outer edge of said belt ply and having a portion thereof overlapping with said belt ply and wherein the angle formed by the cords of said shoulder strips with respect to the mid-circumferential centerplane is at least 5° greater than the angle formed by the cords of said belt ply with respect to the mid-circumferential centerplane.

2. A tire as claimed in claim 1 wherein at least one-third of the axial width of each shoulder strip is disposed axially outwardly of the axial outer edge of said belt ply.

3. A tire as claimed in claim 1 wherein said shoulder strips are disposed radially with a portion overlapping the belt ply and a portion overlapping the carcass by outside the tread area of the tire.

4. A tire as claimed in claim 1 wherein said belt ply is coated with a compound having a high dynamic modulus.

5. A tire as claimed in claim 1 wherein the cords of said belt structure are wire, the cords in said shoulder strips are nylon, and the cords in said carcass structure are fiberglass.

* * * * *